(12) United States Patent
Kurokawa et al.

(10) Patent No.: US 8,649,767 B2
(45) Date of Patent: Feb. 11, 2014

(54) FEMTOCELL COMMUNICATION SYSTEM, APPARATUS, CONTROL METHOD, AND PROGRAM

(75) Inventors: Osamu Kurokawa, Tokyo (JP); Yasuhiro Watanabe, Tokyo (JP); Hiroaki Akiyama, Tokyo (JP); Takayuki Kido, Tokyo (JP); Takuo Akimoto, Tokyo (JP); Yusuke Miyagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 108 days.

(21) Appl. No.: 13/140,851

(22) PCT Filed: Apr. 5, 2010

(86) PCT No.: PCT/JP2010/056158
§ 371 (c)(1),
(2), (4) Date: Jul. 21, 2011

(87) PCT Pub. No.: WO2010/116967
PCT Pub. Date: Oct. 14, 2010

(65) Prior Publication Data
US 2011/0269427 A1 Nov. 3, 2011

(30) Foreign Application Priority Data
Apr. 10, 2009 (JP) ................ 2009-096309

(51) Int. Cl.
*H04W 64/00* (2009.01)

(52) U.S. Cl.
USPC ........ 455/411; 455/436; 455/437; 455/456.1; 455/422.1; 455/410; 370/356; 370/328; 370/329; 370/331; 370/338

(58) Field of Classification Search
USPC ............. 455/454, 436–437, 422.1, 450, 455/456.1–456.2, 410; 370/328–329, 370/338–339
See application file for complete search history.

(56) References Cited

U.S. PATENT DOCUMENTS 8,064,909 B2 * 11/2011 Spinelli et al. ........... 455/436
2008/0076386 A1 3/2008 Khetawat et al.
(Continued)

FOREIGN PATENT DOCUMENTS

| JP | 2009504049 A | 1/2009 |
|---|---|---|
| JP | 2009504051 A | 1/2009 |
| WO | 2008/149116 A2 | 12/2008 |

OTHER PUBLICATIONS

International Search Report for PCT/JP2010/056158 mailed Jul. 6, 2010.
(Continued)

*Primary Examiner* — Kiet Doan
*Assistant Examiner* — Michael T Vu

(57) ABSTRACT

A Femtocell base station has a determination means and a transmission means. The determination means, upon receiving a location update request message from UE (User Equipment), determines whether a first message that prompts the UE to again attempt a location update should be transmitted to the UE, whether a second message that prompts the UE to divert to another network should be transmitted to the UE, or whether a third message that notifies the UE that the location update request is accepted should be transmitted to the UE. The transmission means transmits to the UE either the first message, or the second message, or the third message in accordance with the determination of the determination means.

5 Claims, 12 Drawing Sheets

(56) References Cited

U.S. PATENT DOCUMENTS

2008/0207170 A1   8/2008  Khetawat et al.
2009/0016283 A1*  1/2009  Zhang et al. .................. 370/329
2009/0305666 A1* 12/2009  Tian et al. ..................... 455/410

OTHER PUBLICATIONS

Orange, "Use of differentiated rejection causes for Access Control", 3GPP TSG RAN WG3 meeting # HNB-adhoc, R3-082890, Oct. 22, 2008, pp. 1-3.
3GPP, "3rd Generation Partnership Project; Technical Specification Group Core Network and Terminals; Mobile radio interface Layer 3 specification; Core network protocols; Stage 3 (Release 8)", 3GPP TS24.008, V8.5.0, Mar. 2009, [internet] <URL: http://www.3gpp.org/ftp/Specs/archive/24series/24 >.
Huawei, "UE Access Control and UE Registration", 3GPP TSG RAN WG meeting #61, R3-082028, Jeju, Korea, Aug. 18-22, 2008, [internet] <URL: http://www.3gpp.org/ftg>.
Qualcomm Europe, "UE Registration and Access Control", 3GPP TSG RAN WG3 Meeting #61 bis, R3-082468, Prague, Czech Republic, Sep. 29-Oct. 3, 2008, [internet] <URL: http://www.3gpp.orgiftp/tsg ran/WG3 lu/TSGR3 61bis/docs/R3-082468.zip>.
Japanese Office Action for JP Application No. 2009-096309 mailed on Sep. 10, 2013 with English Translation.

* cited by examiner

Fig.2

| | Examples of Subscriber Users | Modes of Location Update Regulation |
|---|---|---|
| 1 | registered user | No regulation |
| 2 | international roaming user (in or out of contract) | Regulation by Femto AP White List |
| 3 | prepaid user MVNO user | Regulation by Femto AP White List |
| 4 | VPN user double-number user | Regulation upon reception of MAP-Insert Subscriber Data invocation by HSS. |
| 5 | canceled user | Regulation upon reception of MAP-SAI Error by HSS. |
| 6 | authentication NG user | Regulation upon determination by AAA of authentication NG. |

Fig.3

Example of White List settings

```
【1】:440201※
※Permit 440201 IMSI band
【2】:440202
【3】: 440203
【4】: 440204
【5】: 440205 123456789※
※Basically reject the 440205 IMSI band, but permit item 5 users.
【6】: 440206 1
【7】: 440207 12
```

The regulation points at the time of setting the White List above are as follows:
○=permit (accept on the core network side)
×=reject (do not accept on the core network side; location update regulation)

440201~ ⇒○
440202~ ⇒○
440203~ ⇒○
440204~ ⇒○

440205 123456789 ⇒○
440205 234567890 ⇒×

440206 "1"23456789 ⇒○
440206 "2"34567890 ⇒×

440207 "12"3456789 ⇒○
440207 "11"2345678 ⇒×
440207 "21"2345678 ⇒×

44020"8" 123456788 ⇒×

FEMTOCELL COMMUNICATION SYSTEM, APPARATUS, CONTROL METHOD, AND PROGRAM

This application is the National Phase of PCT/JP2010/056158, filed Apr. 5, 2010, which claims the benefits of priority based on JP-A-2009-096309 for which application was submitted on Apr. 10, 2009 and incorporates all of the disclosures of that application.

TECHNICAL FIELD

The present invention relates to a technology for using a Femtocell base station to carry out communication.

BACKGROUND ART

Recent years have seen progress in the development of communication systems that adopt base stations for Femtocells directed toward improving the quality of communication areas.

A Femtocell base station is a compact wireless base station that covers a limited communication area on the order of several tens of meters in radius, that is installed in an interior such as a residence or office, and that has the object of covering an interior communication area. Such a Femtocell base station thus enables an improvement in the communication quality of a communication area that cannot be covered by an existing macrocell base station. In addition, a Femtocell base station can also cover a communication area without incurring the costs entailed in establishing the infrastructure for a macrocell base station.

To date, systems have been developed in which a Femtocell base station is installed in an interior such as a residence or office and only specific subscriber users (UE: User Equipment) connect to a core network by way of the Femto-network that has the Femtocell base station (for example, refer to Patent Documents 1 and 2).

PRIOR ART DOCUMENTS

Patent Documents

Patent Document 1: JP-A-2009-504049
Patent Document 2: JP-A-2009-504051

SUMMARY OF THE INVENTION

Problem to be Solved by the Invention

In recent years, however, there is demand for the development of a system as shown in FIG. 1 in which a Femtocell base station (Femto AP) is installed in, for example, a public facility, and, not only specific subscriber users (UE), but also an unspecified multiplicity of subscriber users (UE) connect to the core network-side by way of the Femtocell base station (Femto AP).

However, in a system in which an unspecified multiplicity of subscriber users (UE) connect to a core network by way of a Femtocell base station (Femto AP), subscriber users (UE) that are not permitted in an IMS (IP Multimedia Subsystem) unfortunately also connect to the core network by way of the Femtocell base station (Femto AP).

In this case, when a Location Update Request is received from a subscriber user (UE) not permitted by the IMS in the system on the core network side, an AUTH Failure message is transmitted to the Femtocell base station (Femto AP).

When the AUTH Failure message is received from the core network side, the Femtocell base station (Femto AP) transmits an authentication error message to the subscriber user (UE) and further prompts the subscriber user (UE) to again attempt a location update. As a result, the subscriber user (UE) issues another location update request in the Femtocell base station (Femto AP) and unnecessary location update processes are repeated. When unnecessary location update processes are carried out repeatedly, the overall load of the system increases, thereby interfering with service to subscriber users (UE) that are permitted by IMS.

Therefore, regarding subscriber users that are not permitted by the IMS, a subscriber user (UE) must be prompted to divert to the Macro network side to regulate unnecessary location update processing.

It is an object of the present invention to regulate unnecessary location update processes in a network that is connected to a communication system provided with a Femtocell base station.

Means for Solving the Problem

The present invention can take the following form to achieve the above-described object.

The Femtocell base station of the present invention includes:

determination means for, upon receiving a location update request message from UE (user equipment), determining whether a first message that prompts the UE to again attempt a location update should be transmitted to the UE, a second message that prompts the UE to divert to another network should be transmitted to the UE, or a third message notifying the UE that the Location Update Request is accepted should be transmitted to the UE; and transmission means that transmits to the UE the first message, the second message, or the third message according to the determination of the determination means.

The control method that is carried out in a Femtocell base station according to the present invention includes steps of:

upon receiving a location update request message from UE (User Equipment), determining whether a first message that prompts the UE to again attempt a location update should be transmitted to the UE, a second message that prompts the UE to divert to another network should be transmitted to the UE, or a third message that notifies the UE that the location update request is accepted should be transmitted to the UE; and transmitting to the UE either the first message, or the second message, or the third message according to the determination result.

BRIEF DESCRIPTION OF THE DRAWINGS

FIG. 2 is a view for explaining the form of location update regulation;

FIG. 3 is a view for explaining an example of setting a White List;

MODE FOR CARRYING OUT THE INVENTION

Exemplary embodiments of the present invention are next described in detail with reference to the accompanying figures.

Summary of Communication System of the Present Exemplary Embodiment

Figure 1:
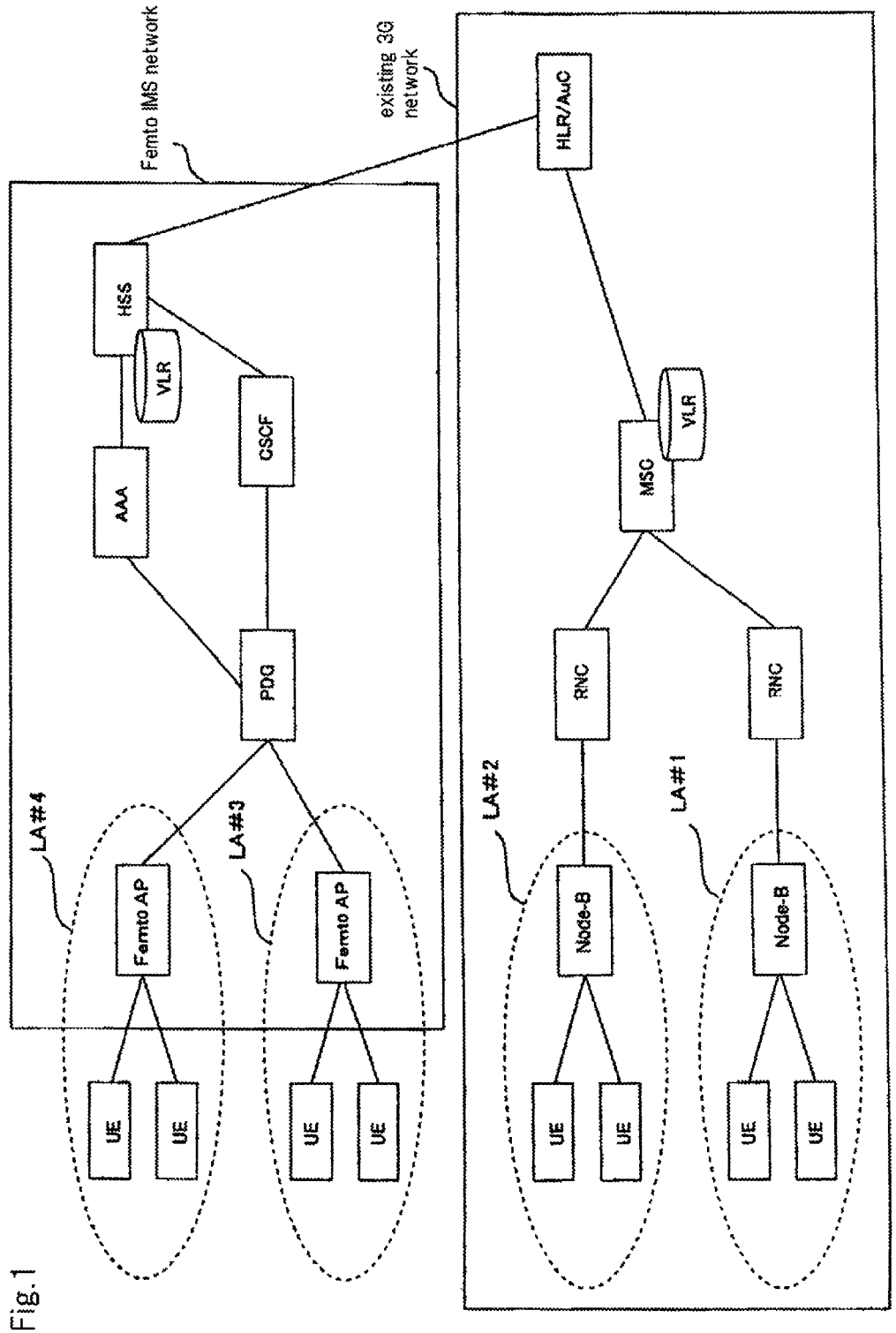
FIG. 1 shows an example of the system configuration of a communication system of the present exemplary embodiment.

Referring first to FIG. 1, an outline of the communication system of the present exemplary embodiment is explained.

The communication system in the present exemplary embodiment is a communication system that includes at least UE (User Equipment) and a Femtocell base station (Femto AP).

Upon receiving a Location Update Request from the UE, the Femtocell base station (Femto AP) determines according to information relating to the UE whether to transmit to the UE a first message prompting the UE to again attempt a location update (Location Update Reject, CV#111), to transmit to the UE a second message prompting the UE to divert to the macro-network side (Location Update Reject, CV#15), or to transmit to the UE a third message notifying the UE that the location update request is accepted (Location Update Accept); and then transmits to the UE either the first message (Location Update Reject, CV#111), or the second message (Location Update Reject, CV#15), or the third message (Location Update Accept).

In this way, the UE carries out processing according to the message received from the Femtocell base station (Femto AP), whereby, for subscriber users (UE) that are not permitted by the IMS, the subscriber user (UE) is prompted to divert to the macro network side, and needless location update processing can be regulated. Details of the communication system of the present exemplary embodiment are next described in detail while referring to the accompanying figures.

Example of the System Configuration of the Communication System

First, referring to FIG. 1, an example of the system configuration of the communication system of the present exemplary embodiment is described.

The communication system of this exemplary embodiment is a configuration that includes an existing 3G network and a Femto IMS (IP Multimedia Subsystem) network.

The existing 3G network is a known existing 3G network and makes up a Macro network. The existing 3G network includes: UE (User Equipment), Node-B, RNC (Radio Network Controller), MSC (Mobile Services Switching Center), VLR (Visitor Location Register), and HLR/AuC (Home Location Register/Authentication Center). The UE, Node-B, RNC, MSC, VLR, and HLR/AuC that make up the existing 3G network are apparatuses that carry out processes that conform to 3GPP, and specific explanation regarding the processing operations is therefore here omitted. The technology that is used in the existing 3G network (communication system) is disclosed in, for example, 3GPP TS 33.234 V8.0.0 (2007-12).

The Femto IMS network includes: Femto AP (Access Point), PDG (Packet Data Gateway), AAA (Authentication Authorization Accounting), CSCF (Call Session Control Function), HSS (Home Subscriber Server) and VLR (Visitor Location Register).

The Femto AP is a compact wireless base station that covers a limited communication area having a radius on the order of several tens of meters.

The PDG is an apparatus for repeating messages.

The CSCF is an apparatus that is the central node in the IMS network and carries out such processes as session control, management, authentication, and routing that use SIP (Session Initiation Protocol).

The AAA is an apparatus that carries out authentication between UE and the network.

The HSS is an apparatus that controls subscriber information of UE that is used in the IMS.

The VLR is an apparatus that stores subscriber information of UE. The HSS acquires subscriber information of UE from the HLR/AuC and stores and manages the subscriber information of the UE that was acquired in the VLR.

In the communication system of the present exemplary embodiment, a Femto AP is installed in, for example, a public facility, and not only specific subscriber users (UE) but also an unspecified multiplicity of subscriber users (UE) connect to the core network side by way of the Femto AP.

As a result, in the communication system of the present exemplary embodiment, subscriber users (UE) not permitted by the IMS (IP Multimedia subsystem) also connect to the core network side by way of the Femto AP. For this reason, location update regulation of subscriber users (UE) not permitted by the IMS (IP multimedia subsystem) must also be carried out in the communication system of the present exemplary embodiment.

The following users can be offered as examples of subscriber users (UE) that are the object of location update regulation.

International roaming users (in and out of contract)
Prepaid users
MVNO (Mobile Virtual Network Operator) users
VPN (Virtual Private Network) users
"Double-Number" (registered trademark) users
Canceled users (users deleted from HLR)
Authentication "NG" (Authentication NG in AAA) users In the present exemplary embodiment, location update regulation of subscriber users (UE) is carried out as shown in FIG. 2.

1: In the case of a registered user, location update regulation is not carried out.

2: In the case of an international roaming user (with or without a contract), users can be identified by the IMSI (International Mobile Subscriber Identity) band (Number), and location update regulation is therefore carried out by a Femto AP White List. FIG. 3 shows an example of the settings of a White List in the present exemplary embodiment. Regarding the White List in the present exemplary embodiment, the IMSI band (numbers) for which location update is permitted are managed, and the Femto AP implements control such that an IMSI band that corresponds to the White List is accepted on the core network side.

In the example of the White List settings shown in FIG. 3, 440201—corresponds to "1," 440202—corresponds to "2," 440203—corresponds to "3," and 440204—corresponds to "4," and control is therefore implemented such that these numbers are accepted on the core network side. Here, "—" indicates any number.

In addition, 440205 123456789 corresponds to "5" and control is implemented such that this number is accepted on the core network side, and 440205 234567890 does not correspond to anything and control is therefore implemented such that this number is not accepted on the core network side.

Further, 440206 "1" 23456789 corresponds to "6" and control is implemented such that this number is accepted on the core network side, and 440206 "2" 34567890 does not correspond to anything and control is implemented such that this number is not accepted on the core network side.

Further, 440207 "12" 3456789 corresponds to "7" and control is implemented such that this number is accepted on the core network side, and 440207 "11" 2345678 and 440207 "21" 2345678 do not correspond to anything and control is implemented such that these numbers are not accepted on the core network side.

44020 "8" 123456789 does not correspond to anything and control is implemented such that this number is not accepted on the core network side.

The Femto AP of the present exemplary embodiment can also manage the White List shown in FIG. 3 and thus implement control such that IMSI bands that do not correspond to the White List are not accepted on the network side. Still further, the White List shown in FIG. 3 uses the information of a portion of the IMSI bands to carry out location update regulation and therefore can ease the load of processing carried out by the Femto AP.

3: Because prepaid users and MVNO users can be identified by the IMSI band, location update regulation is carried out by the Femto AP White List.

4: Because VPN users and double-number users cannot be identified by the IMSI band but can be identified by MAP-ISD (O-CSI), the HSS carries out location update regulation by taking advantage of the reception of MAP-Insert Subscriber Data invocation from the HLR/AuC. More specifically, the HSS carries out location update regulation by taking advantage of the reception of MAP-Insert Subscriber Data invocation from the HLR/AuC after transmitting a MAP Update Location invocation to the HLR/AuC. O-CSI is Originating-CAMEL Subscription Information, and CAMEL is Customized Applications for Mobile Network Enhanced Logic.

5: Canceled users cannot be identified by the IMSI band, and MAP-SAI (CS/PS) is returned from the core network side as an Error, and the HSS therefore carries out location update regulation by taking advantage of the reception of the MAP-SAI Error from the HLR/AuC. CS is Circuit Switching, and PS is Packet Switching.

6: Authentication NG users cannot be identified by the IMSI band, and location update regulation is therefore implemented by taking advantage of the determination of authentication NG by the AAA.

The processing operations of each of the above-described modes of location update regulation are next described.

Location Update Regulation for Registered Users

Figure 4:
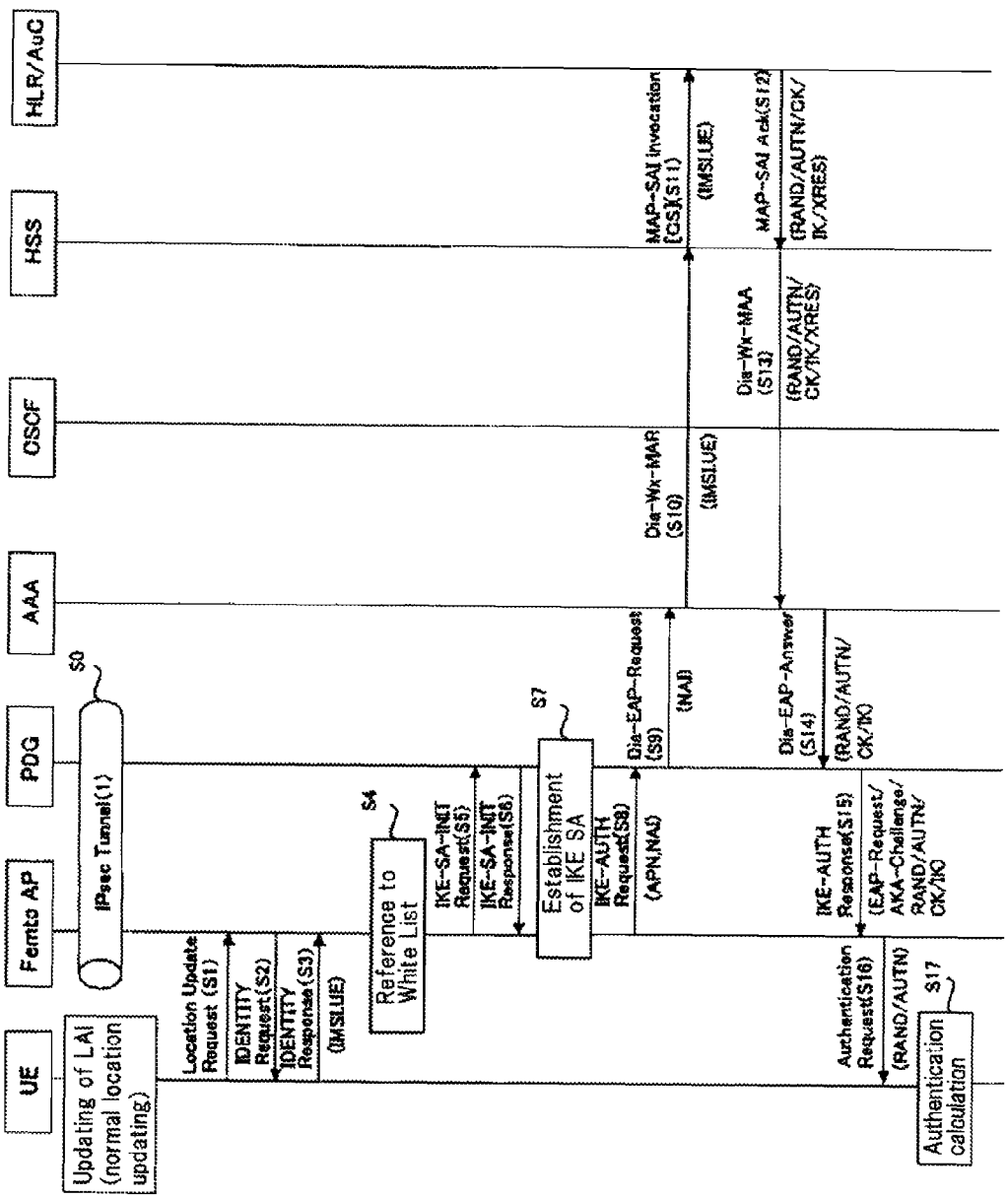
FIG. 4 is a first view for explaining location update regulation for the case of a registered user.
Figure 5:
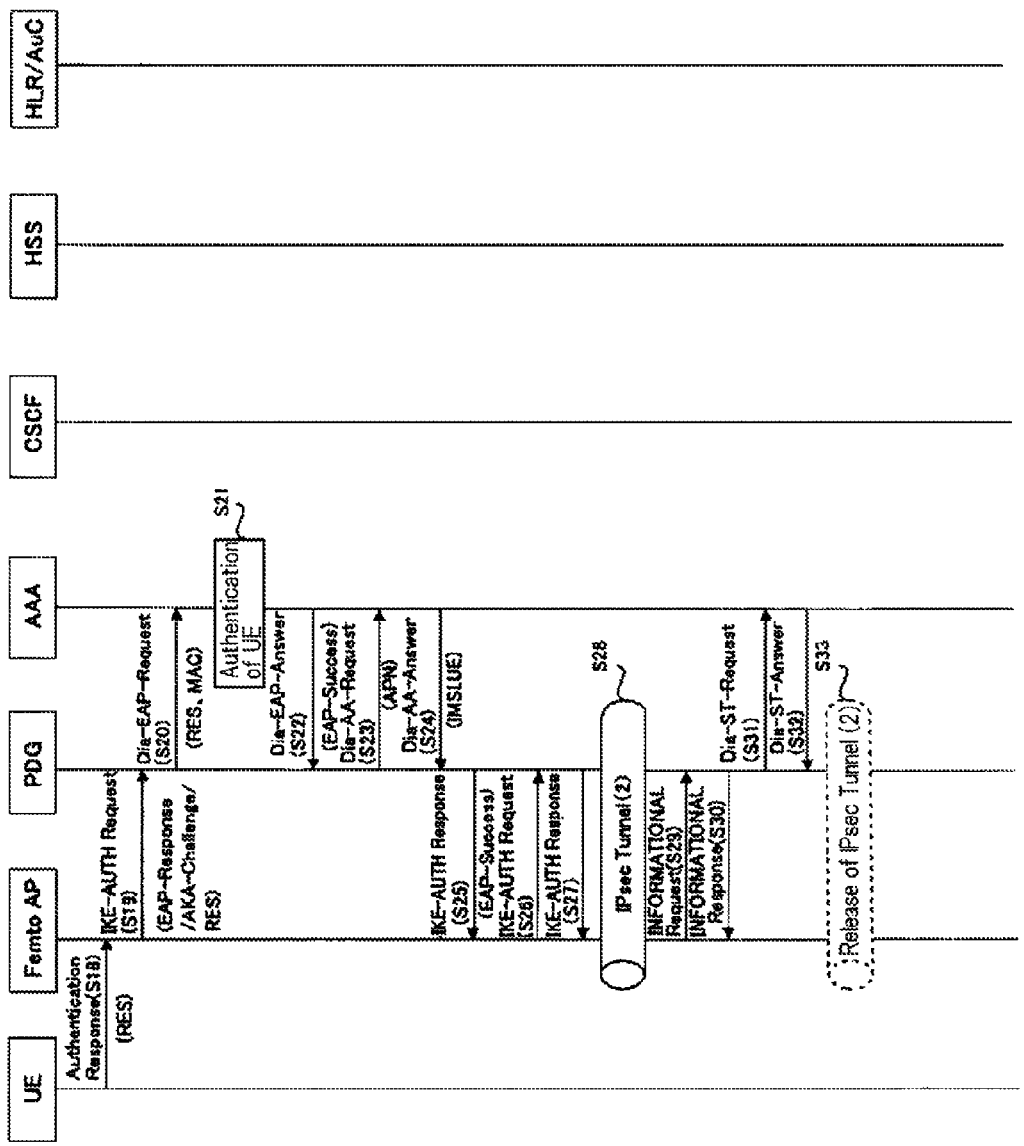
FIG. 5 is a second view for explaining location update regulation for the case of a registered user.
Figure 6:
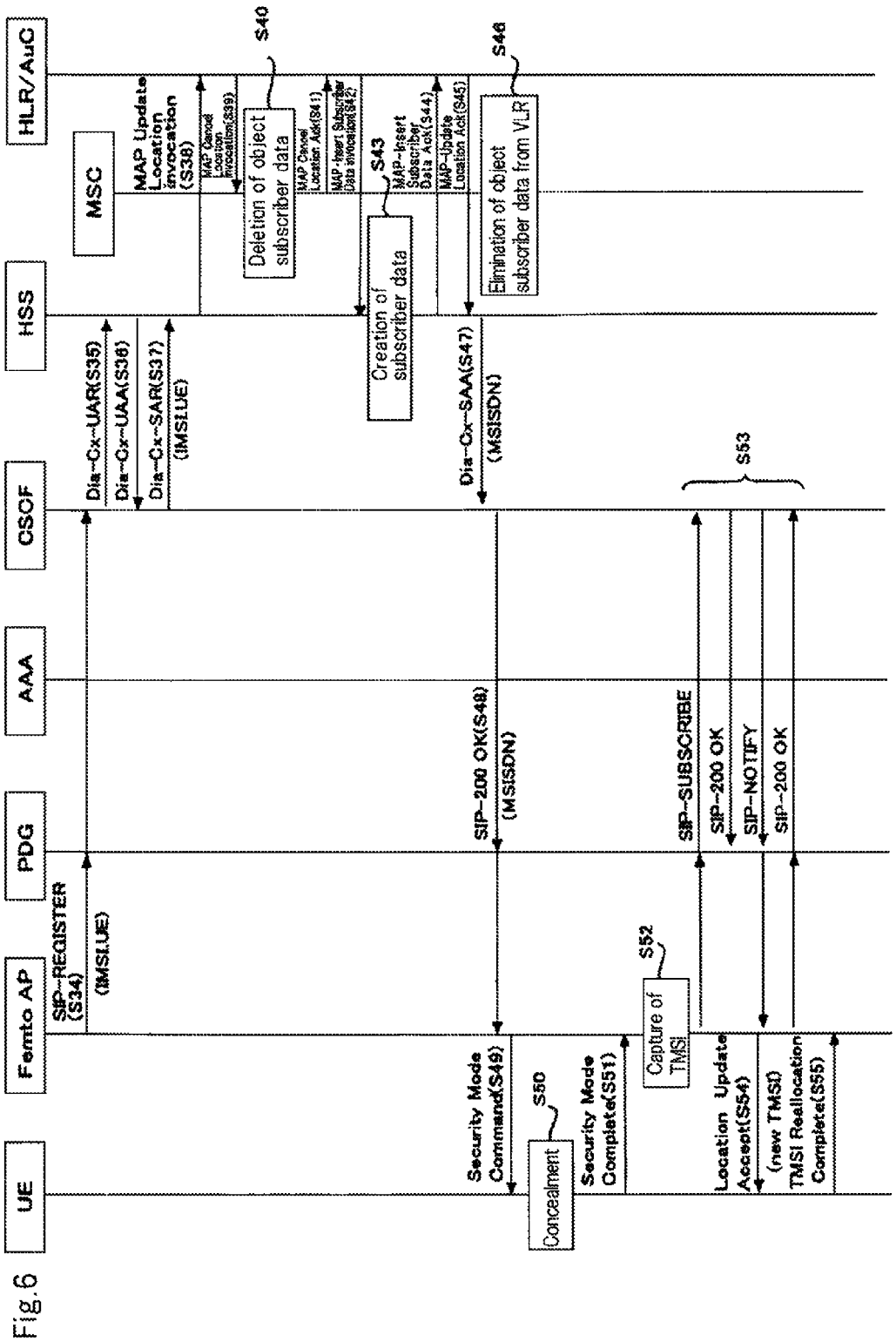
FIG. 6 is a third view for explaining location update regulation for the case of a registered user.

Location update regulation for registered users is first described while referring to FIGS. 4-6. In the communication system of the present exemplary embodiment, control is implemented such that location update regulation is not carried out for registered users. In the following explanation, processing operations for CS (Circuit Switching) Location Update (IMSI)/Attach are described as an example.

When UE moves into a LA (Location Area) (for example, LA#3 shown in FIG. 1) that is under the jurisdiction of a Femto AP of a Femto IMS network that differs from the MSC of the existing 3G network in which the UE last performed location update, the UE begins the location update of the CS service (initial location update). Processing operations, when moving into a LA (Location Area) (LA#3) under the Femto AP jurisdiction, are next described. In the following explanation, it is assumed that an IPsec Tunnel (1) is established between the Femto AP and PDG (Step S0).

When performing updating (normal location updating) of LAI (Location Area Information), the UE transmits a Location Update Request to the Femto AP (Step S1).

The Femto AP, having received the Location Update Request, transmits an IDENTITY Request to the UE (Step S2)

Upon receiving the IDENTITY Request, the UE transmits an IDENTITY Response to the Femto AP (Step S3). The UE transmits the IMSI.UE included in the IDENTITY Response. The IMSI.UE is information for identifying the UE. IMSI.UE is a registered user.

The Femto AP, having received the IDENTITY Response, refers to the White List based on the IMSI.UE contained in the IDENTITY Response and determines whether IMSI.UE corresponds to the user accepted on the core network side (Step S4). If IMSI.UE corresponds to the user accepted on the core network side, the Femto AP transmits an IKE-SA-INIT Request to the PDG (Step S5). The IKE-SA-INIT is Internet Key Exchange-Security Authentication-INITialize.

The PDG, upon receiving the IKE-SA-INIT Request, transmits an IKE-SA-INIT Response to the Femto AP (Step S6).

Upon receiving the IKE-SA-INIT Response, the Femto AP establishes an IKE SA between the Femto AP and the PDG (Step S7).

The Femto AP next transmits an IKE-AUTH Request to the PDG (Step S8). The Femto AP transmits an APN (Access Point Name) and NAI (Network Access Identifier) included in the IKE-AUTH Request. IKE-AUTH is Internet Key Exchange-AUTHentication. APN is information for specifying the link point of the network, and NAI is information for identifying access of the network.

The Femto AP, having received the Location Update Request from the UE, determines that the request is for location update of a CS service and therefore transmits the NAI "OCSO⟨ UE_IMSI⟩/⟨ Femto_IMSI⟩ @realmname".

"OCSO" is information signifying that this is the location updating of a CS service. "⟨ UE_IMSI⟩" is information for identifying the UE and is the IMSI.UE that was contained in the IDENTITY Response received in Step S3. "⟨ Femto_IMSI⟩" is information for identifying the Femto AP.

Upon receiving the IKE-AUTH Request, the PDG transmits a Dia-EAP-Request to the AAA (Step S9). The PDG transmits NAI contained in the IKE-AUTH Request included in the Dia-EA P-Request. Dia-EAP is Diameter-Extensible Authentication Protocol.

The AAA, having received the Dia-EAP-Request, determines based on the NAI contained in the Dia-EAP-Request whether this is a location update of a CS service, the location update of a PS service, or PDP Activate. When the AAA determines that this is a location update of a CS service, it transmits a Dia-Wx-MAR to the HSS (Step S10). The Dia-Wx-MAR is a Diameter-Wx-Multimedia Authentication Request.

Because the NAI is "OCSO⟨UE IMSI⟩/⟨Femto IMSI⟩@realmname", the AAA determines that this is the location update of a CS service and transmits IMSI.UE of the NAI contained in the Dia-EAP-Request included in a Dia-Wx-MAR.

Upon receiving the Dia-Wx-MAR, the HSS transmits a MAP-SAI invocation [CS] to HLR/AuC (Step S11). MAP-SAI is MAP-Send Authentication Information. [CS] means "Circuit Switching." The HSS transmits IMSI.UE that is contained in the Dia-Wx-MAR included in the MAP-SAI invocation [CS].

The HLR/AuC, upon receiving the MAP-SAI invocation (CS), transmits MAP-SAI Ack to the HSS (Step S12). The HLR/AuC acquires RAND/AUTN/CK/IK/XRES that corresponds to IMSI.UE contained in the MAP-SAI invocation [CS] and transmits this acquired RAND/AUTN/CK/IK/XRES included in a MAP-SAI Ack (Step S12).

RAND/AUTN/CK/IK/XRES is information that conforms to 3GPP. RAND is Random challenge, AUTN is an Authentication Token, CK is a Cipher Key, IK is an Integrity Key, and XRES is an Expected RESponse.

In the present processing operations, it is assumed that the HLR/AuC transmits RAND/AUTN/CK/IK/XRES included in MAP-SAI Ack (EAP-AKA authentication). However, there are cases in which RAND/AUTN/CK/KC/RES is transmitted included in the MAP-SAI Ack (EAP-SIM authentication). Regarding EAP-AKA authentication (UMTS authentication) and EAP-SIM authentication (GSM authentication), the HLR/AuC make a selection according to the capability of the NW with which the UE is contracted.

The HSS, upon receiving the MAP-SAI Ack, transmits Dia-Wx-MAA to the AAA (Step S13). Dia-Wx-MAA is a Diameter-Wx-Multimedia Authentication Answer. The HSS transmits the RAND/AUTN/CK/IK/XRES contained in MAP-SAI Ack included in the Dia-Wx-MAA.

The AAA, having received the Dia-Wx-MAA, transmits a Dia-EAP-Answer to the PDG (Step S14). The AAA transmits the RAND/AUTN/CK/IK that was contained in the Dia-Wx-MAA included in the Dia-EAP-Answer.

The PDG, having received the Dia-EAP-Answer, transmits an IKE-AUTH Response to the Femto AP (Step S15). The PDG transmits an EAP-Request/AKA-Challenge and the RAND/AUTN/CK/IK that was contained in the Dia-EAP-Answer included in an IKE-AUTH Response. AKA is an Authentication and Key Agreement.

Upon receiving the IKE-AUTH Response, the Femto AP transmits an authentication Request to the UE (Step S16). The Femto AP transmits RAND/AUTN that was contained in the IKE-AUTH Response included in the Authentication Request.

The UE, having received the Authentication Request, carries out the authentication operation based on RAND/AUTN that was contained in the Authentication Request (Step S17). The authentication operation is carried out by a method that conforms to 3GPP.

The UE calculates RES and transmits the calculated RES to the Femto AP included in an Authentication Response (Step S18). The calculation of RES is carried out by a method that conforms to 3GPP.

The Femto AP, having received the Authentication Response, transmits an IKE-AUTH Request to the PDG (Step S19). The Femto AP transmits an EAP-Response/AKA-Challenge and RES that is contained in the Authentication Response included in the IKE-AUTH Request.

The PDG, having received the IKE-AUTH Request, transmits a Dia-EAP-Request to the AAA (Step S20). The PDG calculates MAC (Message Authentication Code) and transmits RES and MAC included in the Dia-EAP-Request. The calculation of MAC is carried out by a method that conforms to 3GPP.

The AAA, having received the Dia-EAP-Request, carries out UE authentication (Step S21). The authentication of the UE is carried out by a method that conforms to 3GPP.

If UE authentication is successful, the AAA transmits a Dia-EAP-Answer to the PDG (Step S22). The AAA transmits EAP-Success included in the Dia-EAP-Answer.

The PDG, having received the Dia-EAP-Answer, transmits a Dia-AA-Request to the AAA (Step S23). The PDG transmits an APN included in the Dia-AA-Request.

Upon receiving the Dia-AA-Request, the AAA transmits a Dia-AA-Answer to the PDG (Step S24). The AAA transmits IMSI.UE included in the Dia-AA-Answer.

Upon receiving the Dia-AA-Answer, the PDG transmits an IKE-AUTH Response to the Femto AP (Step S25). The PDG transmits EAP-Success included in the IKE-AUTH Response.

The Femto AP, having received the IKE-AUTH Response, transmits an IKE-AUTH Request to the PDG (Step S26).

The PDG, having received the IKE-AUTH Request, transmits an IKE-AUTH Response to the Femto AP (Step S27).

Upon receiving the IKE-AUTH Response, the Femto AP establishes an IPsec Tunnel (2) between the Femto AP and the PDG (Step S28).

The Femto AP next transmits an INFORMATIONAL Request to the PDG (Step S29).

The PDG, having received the INFORMATIONAL Request, transmits an INFORMATIONAL Response to the Femto AP (Step S30).

The PDG further transmits a Dia-St-Request to the AAA (Step S31).

Upon receiving the Dia-ST-Request, the AAA transmits a Dia-ST-Answer to the PDG (Step S32).

The PDG, having received the Dia-ST-Answer, releases the IPsec Tunnel (2) that was established in Step S28 (Step S33).

Because the UE is a registered user in the present exemplary embodiment, the UE passes the White List of the Femto AP, is accepted on the core network side, and undergoes UE authentication processing. After completion of UE authentication, there is no need to establish the IPsec Tunnel (2) that was established between the Femto AP and the PDG in Step S28, whereby the processes of Step S29-Step S32 are carried out and the IPsec Tunnel (2) that was established in Step S28 is released (Step S33). In this way, the unnecessary IPsec Tunnel (2) is released and the effective utilization of resources can be achieved.

The Femto AP next transmits a SIP-REGISTER to the CSCF (Step S34). The Femto AP transmits IMSI.UE included in the SIP-REGISTER to the CSCF.

The CSCF, having received the SIP-REGISTER, transmits a Dia-Cx-UAR to the HSS (Step S35).

The HSS, having received the Dia-Cx-UAR, transmits a Dia-Cx-UAA to the CSCF (Step S36).

Upon receiving the Dia-Cx-UAA, the CSCF transmits a Dia-Cx-SAR to the HSS (Step S37). The CSCF transmits IMSI.UE included in the Dia-Cx-SAR.

The HSS, having received the Dia-Cx-SAR, transmits a MAP Update Location invocation to the HLR/AuC (Step S38). The HSS transmits IMSI.UE included in the MAP Update Location invocation.

Upon receiving the MAP Update Location invocation, the HLR/AuC transmits a MAP Cancel Location invocation to the MSC (Step S39). The HLR/AuC transmits IMSI.UE included in the MAP Cancel Location invocation.

The MSC, having received the MAP Cancel Location invocation, deletes the object subscriber data (Step S40).

The MSC next transmits MAP Cancel Location Ack to the HLR/AuC (Step S41).

The HLR/AuC, having received the MAP Cancel Location Ack, transmits a MAP-Insert Subscriber Data invocation to the HSS (Step S42). Subscriber information is contained in the MAP-Insert Subscriber Data invocation.

Upon receiving the MAP-Insert Subscriber Data invocation, the HSS creates subscriber data based on the subscriber information contained in the MAP-Insert Subscriber Data invocation (Step S43). The HSS registers the subscriber data in the VLR and manages the data.

The HSS next transmits a MAP-Insert Subscriber Data Ack to the HLR/AuC (Step S44).

The HRL/AuC, having received the MAP-Insert Subscriber Data Ack, transmits a MAP-Update Location Ack to the HSS (Step S45).

The MSC, after the object subscriber data has been deleted in Step S40, eliminates the subscriber data from the VLR in which the deleted subscriber data were registered (Step S46).

After having received the MAP-Update Location Ack, the HSS transmits a Dia-Cx-SAA to the CSCF (Step S47). The HSS transmits MSISDN included in the Dia-Cx-SAA.

The CSCF, upon receiving the Dia-Cx-SAA, transmits SIP-200 OK to the Femto AP (Step S48). The CSCF transmits MSISDN included in the SIP-200 OK.

Upon receiving the SIP-200 OK, the Femto AP transmits a Security Mode Command to the UE (Step S49).

The UE, having received the Security Mode Command, carries out concealment (Step S50). The concealment process is carried out by a method that conforms to 3GPP.

The UE transmits Security Mode Complete to the Femto AP (Step S51).

The Femto AP, having received Security Mode Complete, captures TMSI (Temporary Mobile Subscriber Identities) (Step S52). The capture of TMSI is carried out by a method that conforms to 3GPP.

The Femto AP transmits and receives messages with the CSCF to perform verification processing (Step S53/SIP-SUBSCRIBE, SIP-200 OK, SIP-NOTIFY, SIP-200 OK).

The Femto AP further transmits Location Update Accept to the UE (Step S54). The Femto AP transmits new TMSI included in the Location Update Accept.

Upon receiving the Location Update Accept, the UE transmits TMSI Reallocation Complete to the Femto AP (Step S55).

In this way, when the UE is a registered user in the communication system of the present exemplary embodiment, the UE passes through the White List of the Femto AP and is accepted on the core network side, messages are transmitted and received among the UE, Femto AP, PDG, AAA, HSS, and HLR/AuC, the authentication process of the UE is carried out, and an IPsec Tunnel (2) is established between the Femto AP and the PDG when authentication of the UE is successful (Steps S1-S28). The IPsec Tunnel (2) that was established between the Femto AP and PDG in the authentication process of the UE is then released (Steps S29-S33). Messages are subsequently transmitted and received among the Femto AP, PDG, CSCF, HSS, MSC, and HLR/AuC, the subscriber data of the UE that is managed in the VLR of the MSC moves to the HSS, and the subscriber data of the UE is registered in the VLR of the HSS (Steps S34-S43). Thus, when the UE is a registered user, the authentication process of the UE is carried out by way of the Femto AP during the location update of the CS service, and the subscriber data of the UE can be registered in the VLR of the HSS. Although the above-described processes were explained by taking as an example the location updating of a CS service, the UE also passes through the White List of the Femto AP and is accepted on the core network side when the UE is a registered user for cases in which the UE transmits an Attach Request, an RA Update Request, and an Activate PDP Context Request.

Figure 7:
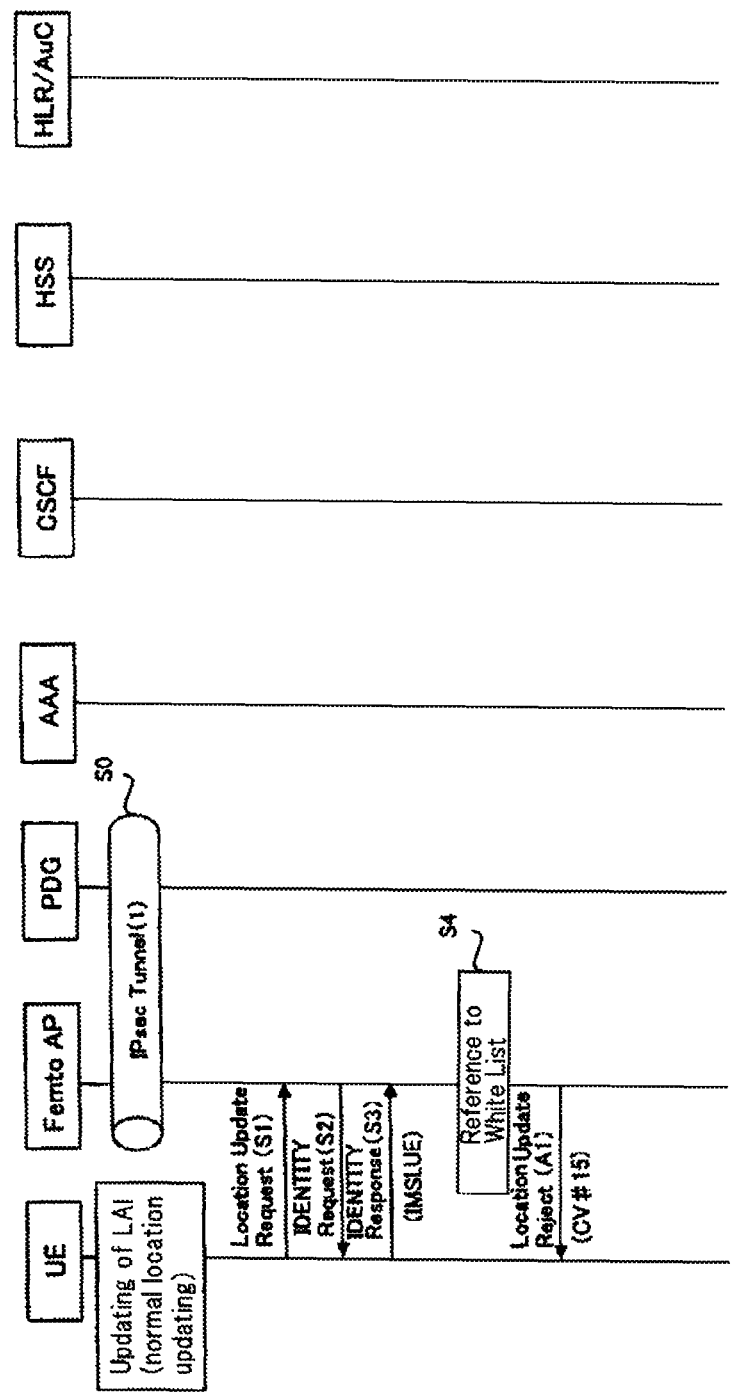
FIG. 7 is a view for explaining location update regulation for the case of an international roaming user (in or out of contract), a prepaid user, and an MVNO user.

Location Update Regulation for International Roaming Users (In and out of contract), Prepaid Users, and MVNO Users Referring now to FIG. 7, Location Update regulation is next described for cases in which the user is an international roaming user (in or out of contract), a prepaid user, or an MVNO user. When the user is an international roaming user (in or out of contract), a prepaid user, or an MVNO user, location update regulation is implemented by a White List managed in the Femto AP.

When performing updating (normal location updating) of LAI (Location Area Information), the UE transmits IMSI.UE included in the IDENTITY Response to the Femto AP (Steps S1-S3).

The Femto AP, having received the IDENTITY Response, refers to the White List based on IMSI.UE contained in the IDENTITY Response and determines whether IMSI.UE corresponds to a user accepted on the core network side (Step S4). If IMSI.UE does not correspond to a user that is accepted on the core network side, the Femto AP transmits a Location Update Reject (Cause Value: CV#15) to the UE (Step A1). CV#15 is a message for prompting the UE to divert to the Macro network side. Because an international roaming user (with or without a contract), a prepaid user, or an MVNO user can be identified by the IMSI band, Location Update Reject (Cause Value: CV#15) can be transmitted to the UE by not managing the IMSI band of these users in the White List.

Upon receiving a Location Update Reject (Cause Value: CV#15), the UE judges that location updating cannot be realized by way of the Femto IMS network and carries out the location update process for connecting to the Macro network (existing 3G network) side.

Thus, for the cases of international roaming users (with or without a contract), prepaid users, and MVNO users in the communication system of the present exemplary embodiment, location update regulation is realized by a White List managed by the Femto AP and these users are not accepted on the core network side. In this case, the Femto AP transmits a Location Update Reject (Cause Value: CV#15) to the UE. In this way, the UE receives the Location Update Reject (Cause Value: CV#15) and carries out the location update process to connect to the Macro network (existing 3G network) side.

Location Update Regulation for Canceled Users

Figure 8:
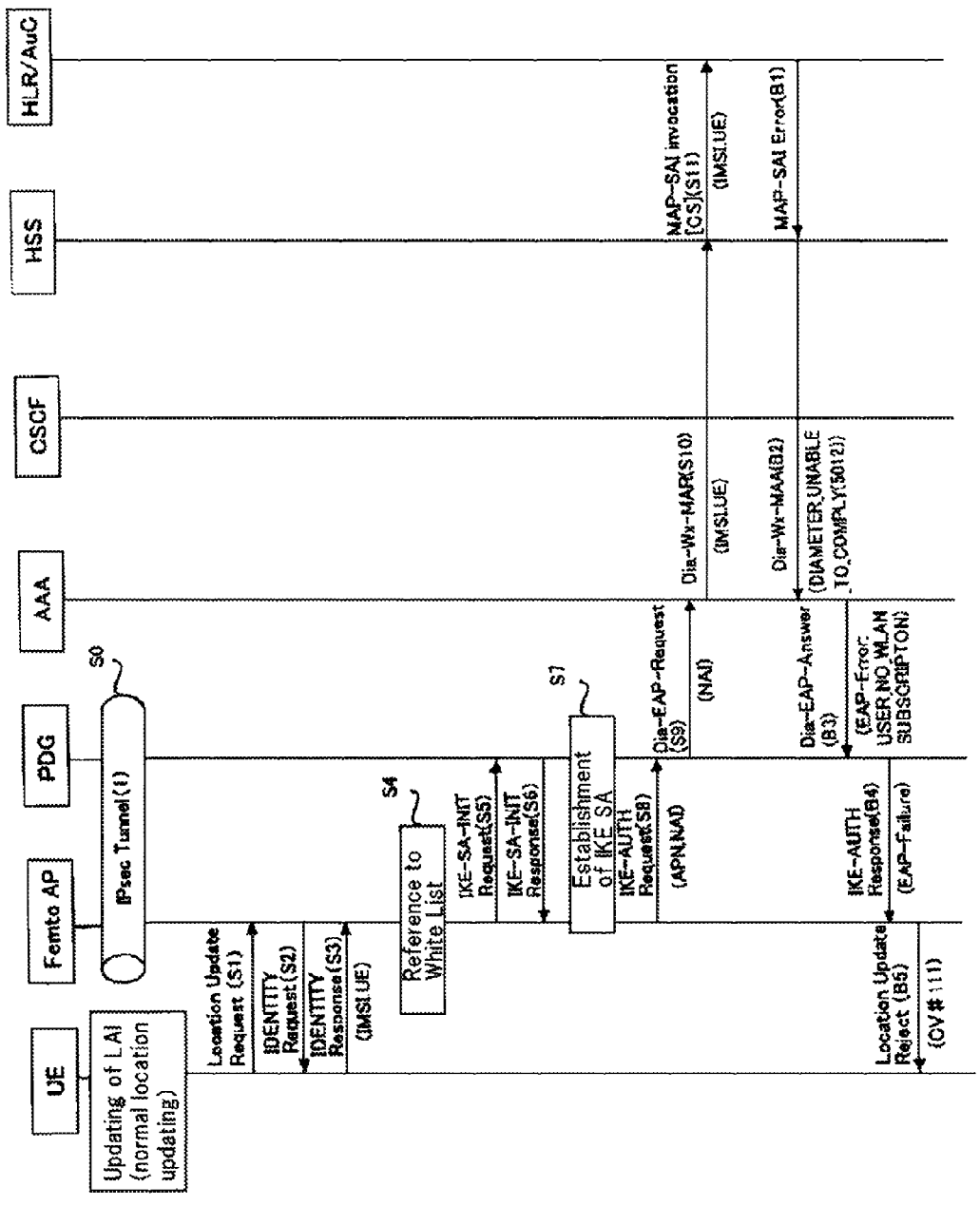
FIG. 8 is a view for explaining the location update regulation for a canceled user.

Location update regulation for canceled users is next explained while referring to FIG. 8.

The processing of S1-S11 shown in FIG. 8 is identical to the processing for a registered user, the UE passing through the Femto AP White List and being accepted on the core network side. Then, upon receiving the Dia-Wx-MAR, the HSS includes the IMSI.UE contained in the Dia-Wx-MAR in a MAP-SAI invocation [CS] and transmits it to the HLR/AuC (Step S11).

Upon receiving the MAP-SAI invocation [CS], the HLR/AuC judges whether IMSI.UE contained in the MAP-SAI invocation [CS] is registered in the HLR or not, and if IMSI.UE is not registered in the HLR, judges that the user is a canceled user and transmits a MAP-SAI Error to the HSS (Step B1). In this action, the UE is a canceled user, and information relating to IMSI.UE is therefore not registered in the HLR. As a result, the HLR/AuC transmits a MAP-SAI Error to the HSS.

Upon receiving the MAP-SAI Error, the HSS transmits a Dia-Wx-MAA to the AAA (Step B2). The HSS transmits DIAMETER_UNABLE_TO_COMPLY(5012) included in the Dia-Wx-MAA.

The AAA, having received the Dia-Wx-MAA, transmits a Dia-EAP-Answer to the PDG (Step B3). The AAA includes the DIAMETER_UNABLE_TO_COMPLY(5012) contained in the Dia-Wx-MAA in the Dia-EAP-Answer.

Upon receiving the Dia-EAP-Answer, the PDG transmits an IKE-AUTH Response to the Femto AP (Step B4). Because DIAMETER_UNABLE_TO_COMPLY(5012) is contained in the Dia-EAP-Answer, the PDG transmits EAP-Failure included in the IKE-AUTH Response.

The Femto AP, upon receiving the IKE-AUTH Response, transmits Location Update Reject (Cause Value: CV#111) to the UE because EAP-Failure is contained in the IKE-AUTH Response (Step B5). CV#111 is a message prompting the UE to carry out location update again.

When the UE receives Location Update Reject (Cause Value: CV#111), it carries out the location update process again.

Thus, in the case of a canceled user in the communication system of the present exemplary embodiment, the HLR/AuC transmits MAP-SAI Error to the HSS, and the HSS, upon receiving the MAP-SAI Error from the HLR/AuC, transmits HDIAMETER_UNABLE_TO_COMPLY(5012) included in the Dia-Wx-MAA to CSCF and carries out location update regulation. As a result, the Femto AP receives an IKE-AUTH Response that includes an EAP-Failure from the core network side and transmits a Location Update Reject (Cause Value: CV#111) to the UE. In this way, the UE receives the Location Update Reject (Cause Value: CV#111) and again carries out the location update process.

Location Update Regulation for Authentication NG Users

Figure 9:
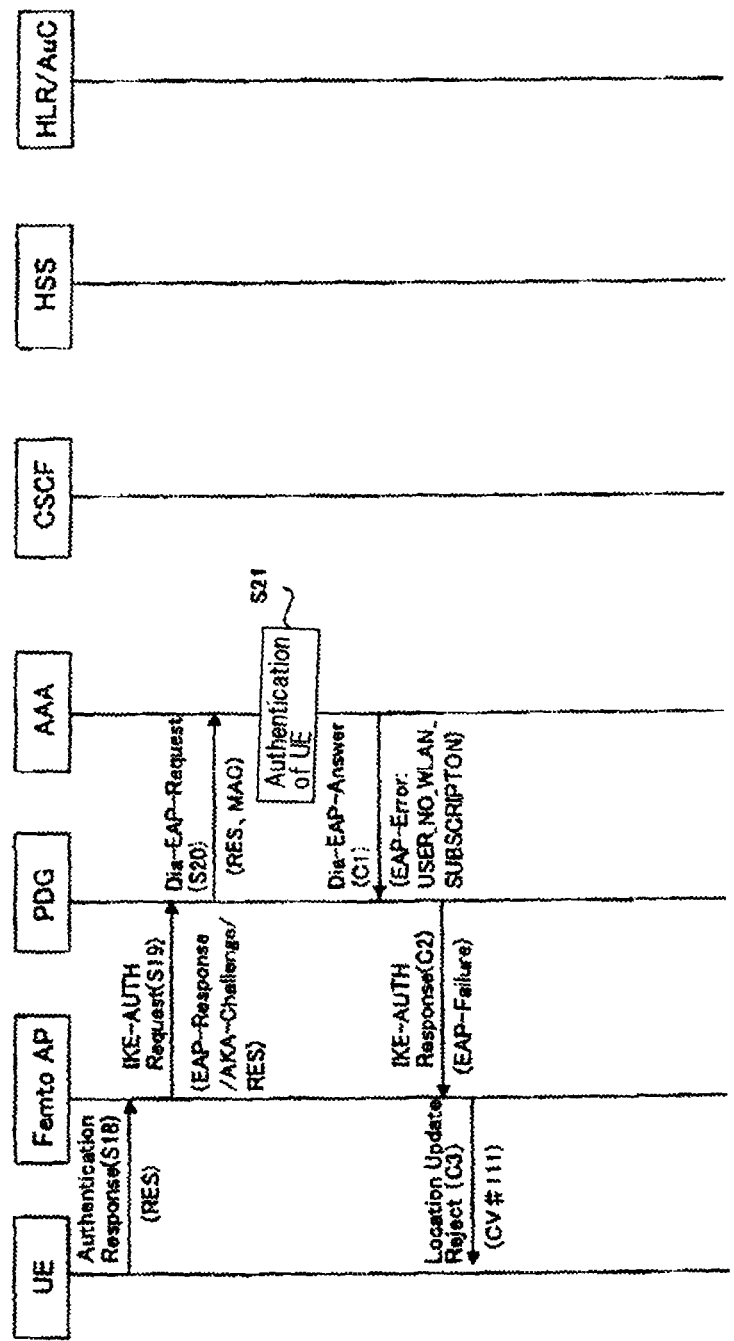
FIG. 9 is a view for explaining location update regulation for the case of an authentication NG user.

Location update regulation for authentication NG users is next described while referring to FIG. 9.

In the case of authentication NG users, the same processing is carried out as for registered users, the UE passing through the White List of the Femto AP and being accepted on the core network side, messages being transmitted and received among the UE, Femto AP, PDG, AAA, HSS, and HLR/AuC, and the authentication process of the UE being carried out (Step S21)

When UE authentication fails, the AAA transmits a Dia-EAP-Answer to the PDG (Step C1). Because the UE authentication has failed, the AAA transmits DIAMETER_UNABLE_TO_COMPLY(5012) included in the Dia-EAP-Answer.

The PDG, having received the Dia-EAP-Answer, transmits an IKE-AUTH Response to the Femto AP (Step C2). Because DIAMETER_UNABLE_TO_COMPLY(5012) is contained in the Dia-EAP-Answer, the PDG transmits EAP-Failure included in the IKE-AUTH Response.

The Femto AP receives the IKE-AUTH Response, and because the EAP-Failure is contained in the IKE-AUTH response, transmits a Location Update Reject (Cause Value: CV#111) to the UE (Step C3). CV#111 is a message prompting the UE to again attempt a location update.

Upon receiving the Location Update Reject (Cause Value: CV#111), the UE again carries out the location update process.

In this way, for the case of an authentication NG user in the communication system of the present exemplary embodiment, the AAA transmits a Dia-EAP-Answer that contains DIAMETER_UNABLE_TO_COMPLY(5012) to the PDG, and carries out location update regulation. As a result, the Femto AP receives an IKE-AUTH Response that contains the EAP-Failure from the core network side and transmits Location Update Reject (Cause Value: CV#111) to the UE. In this way, the UE receives the Location Update Reject (Cause Value; CV#111) and again carries out the location update process.

Location Update Regulation for VPN Users and Double-Number Users

Figure 10:
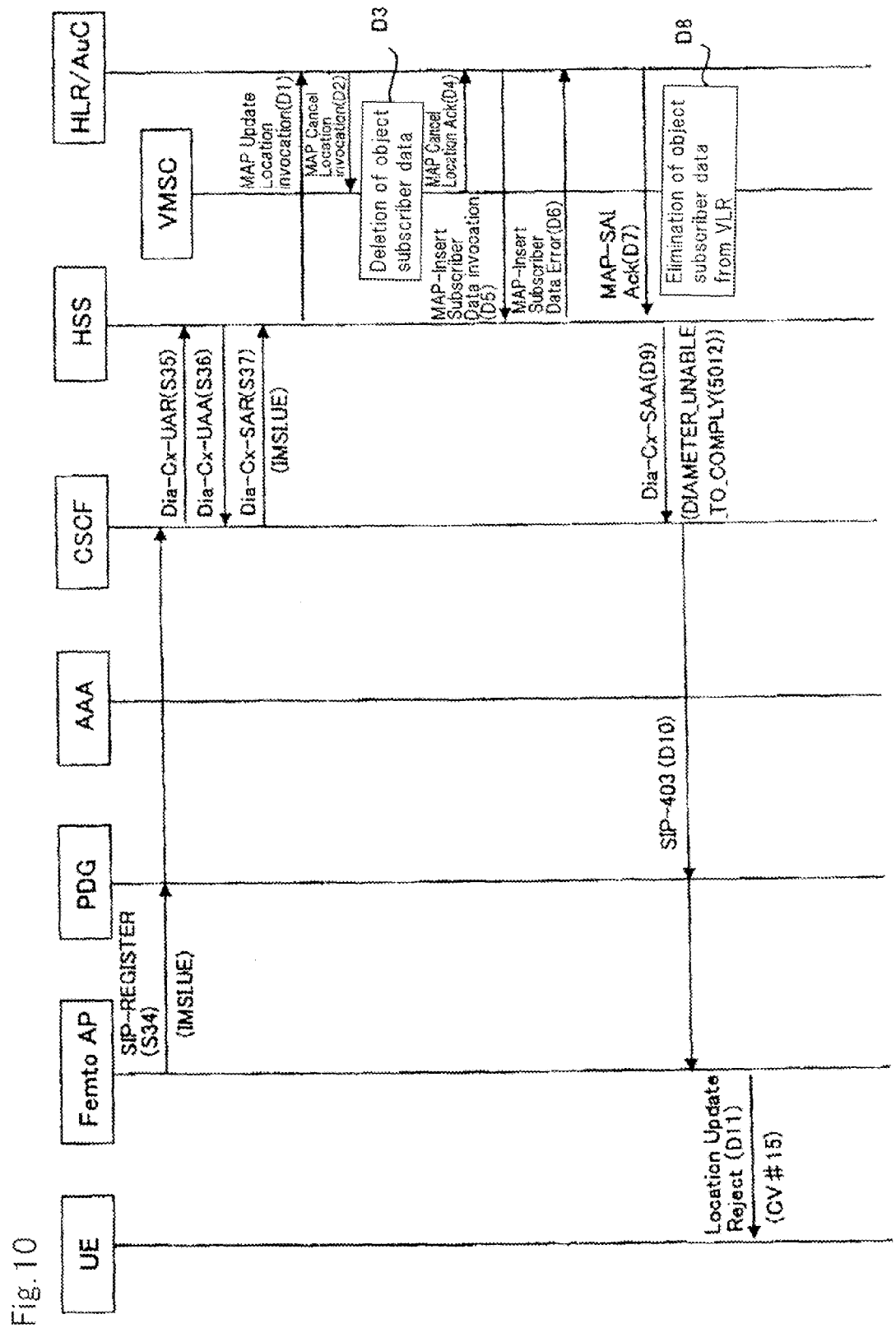
FIG. 10 is a view for explaining location update regulation for the case of a VPN user and a double-number (registered trademark) user.

Location update regulation for VPN users and double-number users is next described while referring to FIG. 10.

In the case of VPN users and double-number users, the same processing is carried out as for registered users, the UE passing through the White List of the Femto AP and being accepted on the core network side, messages being transmitted and received among the UE, Femto AP, PDG, AAA, HSS, and HLR/AuC, the authentication process of the UE being carried out, and an IPsec Tunnel (2) being established between the Femto AP and PDG when authentication of the UE is successful (Steps S1-S28). The IPsec Tunnel (2) that was established between the Femto AP and the PDG in the UE authentication process is then released (Steps S29-33). Subsequently, messages are transmitted and received among the Femto AP, PDG, CSCF, HSS, VMSC, and HLR/AuC.

Upon receiving a Dia-Cx-SAR from the CSCF, the HSS transmits a MAP Update Location invocation to the HLR/AuC (Step D1). The HSS transmits IMSI.UE included in the MAP Update Location.

Upon receiving the MAP Update Location invocation, the HLR/AuC transmits a MAP Cancel Location invocation to the VMSC (Step D2). The HLR/AuC transmits IMSI.UE included in the MAP Cancel Location invocation.

Upon receiving the MAP Cancel Location invocation, the VMSC deletes the object subscriber data (Step D3).

The VMSC next transmits a MAP Cancel Location Ack to the HLR/AuC (Step D4).

When the HLR/AuC has received the MAP Cancel Location Ack, the HLR/AuC transmits a MAP-Insert Subscriber Data invocation to the HSS (Step D5). Subscriber information is included in the MAP-Insert Subscriber Data invocation.

When the HSS receives the MAP-Insert Subscriber Data invocation, the subscriber information contained in this MAP-Insert Subscriber Data invocation is an O-CSI user, whereby the HSS judges that the user subscribes to a service not offered in the communication system of the HSS. As a result, the HSS transmits a MAP-Insert Subscriber Data Error to the HLR/AuC (Step D6). Thus, when the HSS determines that the subscriber information contained in the MAP-Insert Subscriber Data invocation is a user that is subscribed to a service not offered in that communication system, the HSS transmits a MAP-Insert Subscriber Data Error to the HLR/AuC.

When the HLR/AuC receives the MAP-Insert Subscriber Data Error, the HLR/AuC transmits a MAP-SAI Ack to the HSS (Step D7).

The VMSC, after deleting the object subscriber data in Step D3, eliminates the subscriber data from the VLR in which the deleted subscriber data are registered (Step D8).

After receiving the MAP-SAI Ack, the HSS transmits a Dia-Cx-SAA to the CSCF (Step D9). The HSS transmits DIAMETER_UNABLE_TO_COMPLY(5012) included in the Dia-Cx-SAA.

When the CSCF receives the Dia-Cx-SAA, the CSCF transmits SIP-403 to the Femto AP because DIAMETER_UNABLE_TO_COMPLY(5012) is contained in the Dia-Cx-SAA (Step D10).

When the Femto AP receives SIP-403, the Femto AP transmits a Location Update Reject (Cause Value; CV#15) to the UE (Step D11). CV#15 is a message for prompting the UE to divert to the Macro network side.

Upon receiving the Location Update Reject (Cause Value; CV#15), the UE judges that the location update process is not possible by way of the IMS network and carries out the location update process for connecting to the Macro network (existing 3G network) side.

In this way, VPN users and double-number users in the communication system of the present exemplary embodiment, after the HSS has transmitted a MAP Update Location invocation to the HLR/AuC, take advantage of the reception of the MAP-Insert Subscriber Data invocation from the HLR/AuC to carry out location update regulation, and the HSS transmits a MAP-Insert Subscriber Data Error to the HLR/AuC. The HSS then, upon receiving a MAP-SAI Ack from the HLR/AuC, transmits DIAMETER_UNABLE_TO_COMPLY(5012) included in a Dia-Cx-SAA to the CSCF. As a result, the Femto AP receives SIP-403 from the core network, and transmits a Location Update Reject (Cause Value; CV#15) to the UE. In this way, the UE receives the Location Update Reject (Cause Value; CV#15) and carries out a location update process for connecting to the Macro network (existing 3G network) side.

Action and Effects of the Communication System of the Present Exemplary Embodiment Control is thus implemented in the communication system of the present exemplary embodiment such that location update regulation is not carried out for registered users, the normal processes shown in FIGS. 4-6 are carried out, and the Femto AP transmits Location Update Accept to the UE. In the cases of international roaming users (in or out of contract), prepaid users, and MVNO users, control is implemented such that location update regulation is carried out by the White List of the Femto AP and a Location Update Reject (CV#15) is transmitted to the UE. In the case of VPN users and double-number users, control is implemented such that the HSS, upon receiving a MAP-Insert Subscriber Data invocation from the HLR/AuC, carries out location update regulation and the Femto AP transmits a Location Update Reject (CV#15) to the UE. In the case of canceled users, control is implemented such that the HSS, upon receiving a MAP-SAI Error from the HLR/AuC, carries out location update regulation and the Femto AP transmits a Location Update Reject (CV#111) to the UE. Finally, in the case of authentication NG users, control is implemented such that the AAA, upon determining an authentication NG, carries out location update regulation and the Femto AP transmits a Location Update Reject (CV#111) to the UE.

Thus, in the communication system of the present exemplary embodiment, the Femto AP determines whether to: transmit to the UE a message (Location Update Reject; CV#111) prompting the user to again attempt a location update, transmit to the UE a message (Location Update Reject; CV#15) prompting the UE to divert to the Macro network side, or transmit to the UE a message (Location Update Accept) notifying the UE that the location update request is accepted; and transmits to the UE one of the messages (Location Update Reject, CV#111; OR Location Update Reject, CV#15; OR Location Update Accept). The UE then carries out processing according to the message (Location Update Reject, CV#111; OR Location Update Reject, CV#15; OR Location Update Accept) that was received from the Femto AP.

As a result, for subscriber users (UE) not permitted by the IMS, the communication system of the present exemplary embodiment prompts subscriber users (UE) to divert to the Macro network side and enables regulation of unnecessary location update processes.

The above-described exemplary embodiment is a suitable exemplary embodiment of the present invention, but the scope of the present invention is not limited to only the above-described exemplary embodiment and can also be worked in modes in which various modifications have been applied within a scope that does not depart from the gist of the present invention.

For example, in the above-described exemplary embodiment, the Femto AP uses a White List to carry out location update regulation. However, an embodiment can be constructed such that a Black List is used to carry out location update regulation.

In addition, although the Femto AP transmits a Cause Value such as CV#111 or CV#15 to the UE in the exemplary embodiment described hereinabove, the Cause Value transmitted to the UE is not limited to CV#111 or CV#15 and the present invention can be applied by setting Cause Values to any value that allows distinguishing between, for example, a message prompting the UE to again attempt a location update and a message prompting the UE to divert to the macro network side. In addition, the present invention can further be constructed such that a Cause Value is not used as long as, for example, a message prompting the UE to again attempt a location update can be distinguished from a message prompting the UE to divert to the macro network side.

The communication system in the present exemplary embodiment is capable of carrying out processing without depending on the version of 3GPP.

The control operations of the various apparatuses that make up the communication system in the present exemplary embodiment described above can be executed by using hardware, by using software, or by using a composite composition of hardware and software.

Figure 11:
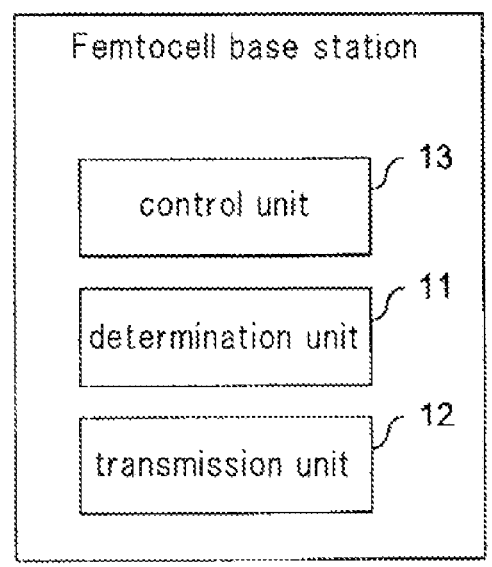
FIG. 11 is a block diagram showing the schematic functional configuration of a Femtocell base station.

FIG. 11 is a block diagram showing the schematic functional configuration of a Femtocell base station. Referring to FIG. 11, the Femtocell base station includes determination unit 11, transmission unit 12, and control unit 13.

When determination unit 11 receives a location update request message from the UE, it determines whether a first message prompting the UE to again attempt a location update should be sent to the UE, whether a second message prompting diversion to another network should be sent to the UE, or whether a third message notifying the UE that the location update request is accepted should be sent.

Transmission unit 12 transmits to the UE either the first message, or the second message, or the third message according to the determination of determination unit 11.

Control unit 13 manages regulation information for determining that a UE is a UE to which the second message should be sent. When the above-described determination unit 11 receives a location update request from a UE, it may acquire information that specifies the UE, refer to the regulation information managed by control unit 13, and, if the information that specifies the UE corresponds to the regulation information, may determine that the second message should be transmitted to the UE.

Figure 12:
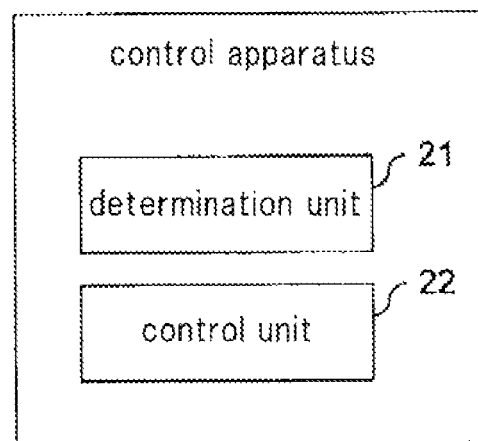
FIG. 12 is a block diagram showing the schematic functional configuration of a control apparatus for controlling subscriber information.

FIG. 12 is a block diagram showing schematic functional configuration of a control apparatus that manages subscriber information. In a communication system provided with a Femtocell base station, this control apparatus acquires subscriber information of UE (User Equipment) that is registered in an HLR (Home Location Register) of a core network that is connected to the communication system, and manages the acquired subscriber information of the UE. Referring to FIG. 12, the control apparatus includes determination unit 21 and control unit 22.

Determination unit 21 transmits, to the HLR, information that specifies UE from a Femtocell base station that has received a location update request message from UE, and based on information relating to the UE that was received from the HLR, determines whether the subscriber information of the UE is subscriber information of a user that is subscribed to a service not offered in that communication system.

When determination unit 21 has determined that the subscriber information of a UE is subscriber information of a user that is subscribed to a service not offered in that communication system, control unit 22 implements control such that the Femtocell base station transmits a message to the UE prompting the UE to divert to another network.

Figure 13:
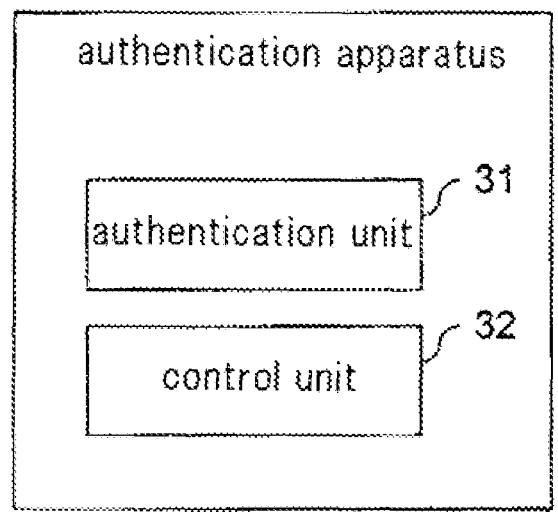
FIG. 13 is a block diagram showing the schematic functional configuration of an authentication apparatus that carries out authentication of UE in a communication system provided with a Femtocell base station.

FIG. 13 is a block diagram showing the schematic functional configuration of an authentication apparatus that performs authentication of UE in a communication system provided with a Femtocell base station. Referring to FIG. 13, the authentication apparatus includes authentication unit 31 and control unit 32.

Authentication unit 31 carries out authentication of the UE based on the information that specifies UE from the Femtocell base station that has received location update request messages from UE.

If authentication of a UE by authentication unit 31 fails, control unit 32 implements control such that, by transmitting an authentication failure message to the Femtocell base station, the Femtocell base station transmits to the UE a message prompting the UE to again attempt a location update.

When processing in each apparatus is executed by using a computer and software, a program that records the processing sequence may be installed in memory in a computer that is incorporated in dedicated hardware and then executed. Alternatively, a program can be installed in a general-purpose computer capable of executing various processes and the program is then executed.

For example, a program can be recorded in advance in a hard disk or ROM (Read Only Memory) as a recording medium. Alternatively, a program can be temporary or permanently stored (recorded) on a removable recording medium. Such a removable recording medium can be offered as "packaged software." Examples that can be offered as the removable recording medium include: a floppy (registered trademark) disk, CD-ROM (Compact Disc Read-Only Memory), a MO (Magneto Optical) disk, a DVD (Digital Versatile Disk), a magnetic disk, and semiconductor memory.

The program may be installed on a computer from the above-described removable recording medium. Alternatively, the program may be wirelessly transferred to a computer from a download site. Still further, the program may be transferred by wire to a computer by way of a network.

The communication system in the present exemplary embodiment can be constructed such that, not only are processes executed in a time sequence in accordance with the processing operations described in the above-described exemplary embodiment, but processes are also executed individually or in parallel according to necessity or the processing capabilities of apparatuses that execute processing.

The communication system in the present exemplary embodiment can be constructed as a logical collected configuration of a plurality of apparatuses or a configuration in which the apparatus of each configuration exists within the same case.

What is claimed is:

1. A Femtocell base station comprising:
a determination unit that, upon receiving a location update request message from UE (user equipment), determines whether a first message that prompts said UE to again attempt a location update should be transmitted to said UE, whether a second message that prompts said UE to divert to another network should be transmitted to said UE, or whether a third message notifying said UE that the location update request is accepted should be transmitted to said UE;
a transmission unit that transmits to said UE either said first message, or said second message, or said third message according to the determination of said determination unit; and
a control unit that manages regulation information for determining that a UE is a UE to which said second message should be transmitted;
wherein said determination unit, upon accepting a location update request from said UE, acquires information that specifies said UE, refers to said regulation information that is managed by said control unit, and, if the information that specifies said UE corresponds to said regulation information, determines to transmit said second message to said UE.

2. The Femtocell base station as set forth in claim 1, wherein said determination unit, if information that specifies said UE does not correspond to said regulation information, transmits information that specifies said UE to a core network side.

3. The Femtocell base station as set forth in claim 2, wherein said determination unit, when said information that specifies said UE does not correspond to said regulation information and after information that specifies said UE is transmitted to the core network side, determines that said first message should be transmitted to said UE upon receiving an authentication failure message, determines that said second message should be transmitted to said UE upon receiving a request failure message, and determines that said third message should be transmitted to said UE upon receiving a request success message.

4. The Femtocell base station as set forth in claim 1, wherein said control unit uses at least a portion of information of an IMSI band to manage said regulation information.

5. The Femtocell base station as set forth in claim 4, wherein:
    said control unit manages said regulation information that takes as a White List at least a portion of the information of the IMSI band; and
    said determination unit determines that information that specifies said UE does not correspond to said regulation information if the IMSI information of said UE corresponds to information of said White List and determines that information that specifies said UE corresponds to said regulation information if the IMSI information of said UE does not correspond to information of said White List.

* * * * *